United States Patent
Quarfoth et al.

(10) Patent No.: US 12,344,406 B1
(45) Date of Patent: Jul. 1, 2025

(54) HIGH TEMPERATURE RF SURFACE APERTURE

(71) Applicant: HRL LABORATORIES, LLC, Malibu, CA (US)

(72) Inventors: Ryan Quarfoth, Malibu, CA (US); Christopher Roper, Malibu, CA (US); Jacob Hundley, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 324 days.

(21) Appl. No.: 17/887,697

(22) Filed: Aug. 15, 2022

Related U.S. Application Data

(60) Provisional application No. 63/234,031, filed on Aug. 17, 2021.

(51) Int. Cl.
- *B64G 1/58* (2006.01)
- *H01Q 1/28* (2006.01)
- *B64D 47/00* (2006.01)

(52) U.S. Cl.
CPC ............... *B64G 1/58* (2013.01); *H01Q 1/28* (2013.01); *B64D 47/00* (2013.01)

(58) Field of Classification Search
CPC ............ B64G 1/58; B64D 47/00; H01Q 1/28
See application file for complete search history.

(56) References Cited

U.S. PATENT DOCUMENTS

| | | | |
|---|---|---|---|
| 4,453,142 A | 6/1984 | Murphy | |
| 4,562,416 A | 12/1985 | Sedivec | |
| 4,725,793 A | 2/1988 | Igarashi | |
| 6,580,859 B1* | 6/2003 | Maier | G02F 1/3521 385/5 |
| 2005/0157973 A1* | 7/2005 | Grobnic | G02B 6/12 385/14 |
| 2006/0145694 A1* | 7/2006 | Oppenlander | G01R 33/0358 324/248 |
| 2010/0164655 A1* | 7/2010 | Kawaguchi | H01P 3/12 333/254 |
| 2013/0321816 A1* | 12/2013 | Dattner | G01J 3/44 356/451 |
| 2016/0231029 A1* | 8/2016 | Pan | A47B 23/04 |
| 2018/0306512 A1* | 10/2018 | Woodard | H05B 6/6402 |
| 2022/0338765 A1* | 10/2022 | Ebert | G01N 33/49 |
| 2023/0096345 A1* | 3/2023 | Lewis | H04B 1/3888 361/688 |
| 2023/0273468 A1* | 8/2023 | Yao | G02F 1/0353 385/2 |

* cited by examiner

*Primary Examiner* — Thien M Le
(74) *Attorney, Agent, or Firm* — Lewis Roca Rothgerber Christie LLP

(57) ABSTRACT

A radio frequency surface-aperture, including: a mechanical support structure configured for maintaining mechanical stiffness and strength at a selected temperature; thermal insulation having at least a single layer; one or more through-thickness waveguides located through a thickness of the mechanical support structure and thermal insulation; a cold-side mode coupler arranged to connect a designated cold side of the one or more through-thickness waveguides to an electronic subsystem device; and one or more surface-wave waveguides arranged as an RF antenna on a surface of the mechanical support structure in operative communication with the through-thickness waveguides.

25 Claims, 2 Drawing Sheets

HIGH TEMPERATURE RF SURFACE APERTURE

This patent application is related to and claims the benefit of priority to U.S. Provisional Patent Application No. 63/234,031, filed on Aug. 17, 2021, the contents of which are incorporated herein by reference in their entirety.

FIELD

The present disclosure relates to a radio frequency surface-aperture and a method of using and manufacturing a radio frequency surface-aperture.

BACKGROUND

Known high heat flux radio frequency (RF) apertures use a low-loss RF window to thermally insulate an Active Electronically Scanned Array (AESA) from a high heat flux, high temperature environment, but this is infeasible at higher temperature environments such as those above 1200° C. because there are no aperture configurations and/or materials that have the desired features of: (1) low RF loss, (2) ability to withstand high temperature, and (3) ability to withstand the aero-mechanical loads of hypersonic flight.

Known methods are limited to operating at temperatures below 1200° C. For example, a known state of the art method uses a transparent RF window which thermally insulates the AESA from a hot exterior of a vehicle. These thermal windows have the three noted features of: (1) low RF loss, (2) ability to withstand high temperature, and (3) ability to withstand the mechanical load of the hypersonic air flow. Materials are known which have all three features for temperatures up to 1200° C. There are no known materials that have these characteristics up to 2000° C. and beyond.

Mechanical integration (attachment, sealing) of an RF window into a thermal protection system (TPS) is a significant challenge in current vehicles. Additionally, lower temperature-capable window materials have different erosion or ablation characteristics than the TPS, leading to increased aerothermal heating due to surface discontinuities, subsequently increasing thermo-mechanical loads and probability of failure. For example, a document by E. A Kuhlman, High Temperature Antennas for Space Shuttle, NASA Contractor Report CR-2294 (1973), describes such a known high temperature RF aperture design, the disclosure of which document is hereby incorporated by reference herein in its entirety.

Known state of art systems use a transparent RF window configuration as an RF transparent thermal barrier to protect an AESA. However, this configuration is infeasible at temperatures near or above approximately 1200° C. because known RF window materials do not have (1) low RF loss; (2) an ability to withstand high temperature; and (3) an ability to withstand a mechanical load of hypersonic air flow.

SUMMARY

A radio frequency surface-aperture is disclosed, comprising: a mechanical support structure configured for maintaining mechanical stiffness and strength at a selected temperature; thermal insulation having at least a single layer; one or more through-thickness waveguides located through a thickness of the mechanical support structure and thermal insulation; a cold-side mode coupler arranged to connect a designated cold side of the one or more through-thickness waveguides to an electronic subsystem; and one or more surface-wave waveguides arranged as an RF antenna on a surface of the mechanical support structure in operative communication with the through-thickness waveguides.

A method of manufacturing a radio frequency surface-aperture is also disclosed, the method comprising: providing a mechanical support structure selected for maintaining mechanical stiffness and strength at a selected temperature up to or greater than 1200° C.; applying a thermal insulation having at least a single layer to the mechanical support structure; establishing one or more through-thickness waveguides through a thickness of the mechanical support structure and the thermal insulation; arranging a cold-side mode coupler in operative contact with the mechanical support structure and thermal insulation to connect a designated cold side of the one or more through-thickness waveguides to an electronic subsystem; and providing one or more surface-wave waveguides arranged as an RF antenna on a surface of the mechanical support structure in operative communication with the through-thickness waveguides.

BRIEF DESCRIPTION OF THE DRAWINGS

Other features and advantages of the present disclosure will become more apparent upon reading the following detailed description in conjunction with the accompanying drawings, wherein.

DETAILED DESCRIPTION

Figure 1:
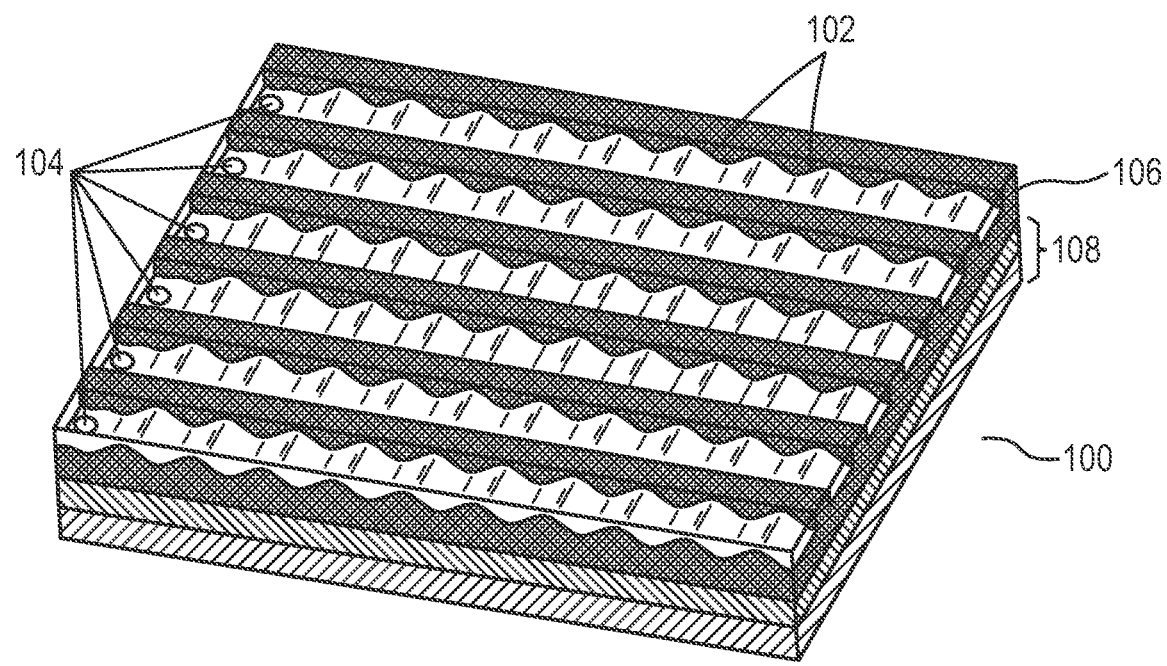
FIG. 1 is an isometric view of an exemplary embodiment of a radio frequency surface-aperture as disclosed herein wherein a dielectric layer of surface wave waveguides is depicted as translucent to provide better viewing of internal structure.

An exemplary aperture as disclosed in FIG. 1 uses a novel architecture to enable higher temperatures over a much broader temperature range, including temperatures that can extend over a range from very low temperatures to well above 1200° C.

The present disclosure encompasses radio frequency surface-apertures, such as the aforementioned Active Electronically-Scanned Array (AESA) that can operate in high heat flux (>10 W/cm$^2$) and/or high temperature (>1200° C.) environments under mechanical loading.

Referring to FIG. 1, an exemplary architecture of a radio frequency surface-aperture 100 as disclosed herein includes a mechanical support plane 106 made from a high-temperature, mechanically-robust material located on thermal insulation layers 108. The mechanical support can be considered to have poor RF performance relative to other materials/layers of the aperture.

An array of surface wave waveguides 102 can be formed on a surface of the mechanically robust material of the mechanical support plane 106 using patterned high temperature capable thin films to function as a steerable RF antenna. A small number of through-thickness waveguides 104 can penetrate the mechanically robust material of the mechanical support plane 106 to connect the surface wave waveguides 104 to a radar or seeker system that is thermally insulated from a high temperature external environment.

The exemplary aperture 100 can be configured using constituent materials that each achieve only two of three specified features regarding: (1) low RF loss; (2) an ability to withstand high temperature; and (3) an ability to withstand aero mechanical loads of hypersonic flight but as disclosed herein, in combination, achieve all three features. A mechanical robustness is, for example, provided by outer material which primarily fills the aperture, and low loss can be achieved by waveguides where RF power will be concentrated.

As described herein, exemplary embodiments can allow for AESA operation from below 1200° C. to well above 1200° C. (e.g., including temperatures up to and including 1200° C.). High temperature operation can be specified as critical for hypersonic vehicles where extremely high heat fluxes lead to high external surface temperatures. It is desirable to have RF payloads that can transmit and receive in such an environment while maintaining low (<100° C.) operating temperatures for radar or seeker electronics.

A radio frequency surface-aperture, as disclosed herein thus includes a mechanical support plane, or structure 106 configured for maintaining mechanical stiffness and strength at a selected temperature; thermal insulation layer(s) 108 having at least a single layer; and one or more through-thickness waveguides 104 located through a thickness of the mechanical support structure and thermal insulation.

Figure 2:
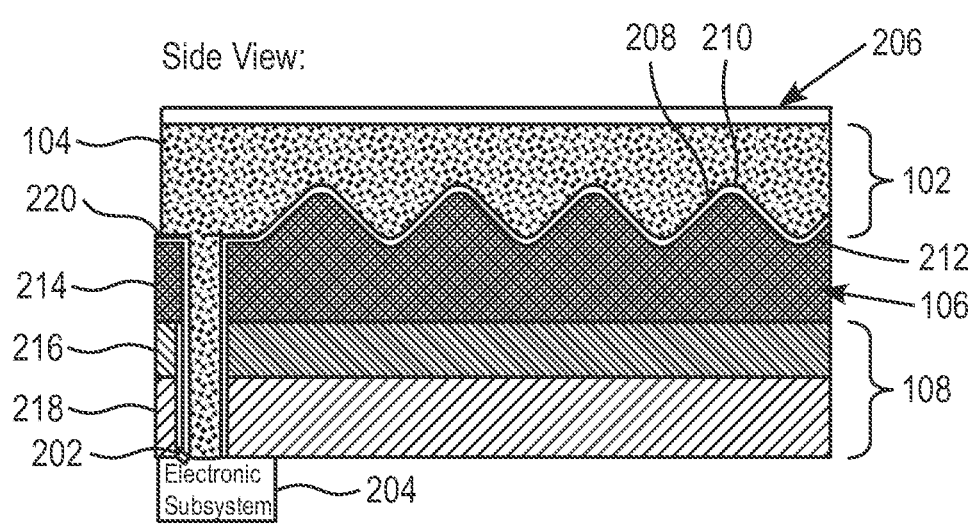
FIG. 2: is a cross-sectional side view of the exemplary FIG. 1 embodiment.

Referring to an exemplary FIG. 2 side view of the exemplary FIG. 1 embodiment, a cold-side mode-coupler 202 is arranged to connect a designated cold side of the one or more through-thickness waveguides 104 to an electronic subsystem 204, such as a radar or seeker device that can be optionally mounted on or within a vehicle (e.g., aircraft, unmanned aerial vehicle (UAV), missile or any airborne device). As shown in FIG. 2, exemplary through-thickness waveguides are configured with a dielectric core 214, conductive cladding 216, and a diffusion barrier 218.

One or more of the surface-wave waveguides 102 on a surface of the mechanical support structure are thereby in operative communication with the through-thickness waveguides 104 and the electronic subsystem 204. An optional high emissivity coating 206 and dielectric layer 208 can be provided on the surface wave waveguide as shown in FIG. 2 along with a conductive ground 210 of the surface wave waveguides and a diffusion barrier 212.

The present disclosure also relates to a method of applying and using an aperture as disclosed herein on any of a variety of vehicles (e.g., air, but also land and/or sea), in conjunction with any known or to be developed electronic subsystem including but not limited to a seeker, or radar, or other device which is arranged to received RF energy via the aperture.

An exemplary method of manufacturing a radio frequency surface-aperture, as disclosed herein includes: providing a mechanical support structure selected for maintaining mechanical stiffness and strength at a selected temperature equal to or greater than 1200° C.; applying a thermal insulation having at least a single layer to the mechanical support structure; establishing one or more through-thickness waveguides through a thickness of the mechanical support structure and the thermal insulation; arranging a cold-side mode coupler in operative contact with the mechanical support structure and thermal insulation to connect a designated cold side of the one or more through-thickness waveguides to a radar or seeker device or other electronic subsystem; and providing one or more surface-wave waveguides on a surface of the mechanical support structure in operative communication with the through-thickness waveguides.

The disclosed method does not require use of a transparent RF window. Instead, the aperture can be positioned on top of an RF-opaque mechanical support structure that can have desired (e.g., enhanced) thermal and mechanical properties, but which can possess poor RF performance (e.g., high RF loss or high RF conductivity which could make the aperture window reflective).

A small number of high temperature capable, low RF loss through-thickness RF waveguides can enable RF transmission to an aerosurface of a vehicle such as a suppression aircraft. The number of these waveguides included in a system can be kept relatively small (e.g., preferably <20, e.g., more preferably <10 or any appropriate number) to limit thermal conduction through the aperture. These through thickness waveguides can penetrate several inches into the vehicle and allow low-loss wave propagation from the hot exterior to the cool interior. On the cool interior the waveguides can be combined with a traditional feed network to create an AESA.

In exemplary embodiments, the waveguides can be a relatively small portion of the aperture, such that the overall mechanical properties of the aperture will effectively be similar to that of the mechanical support structure. RF energy transmitted through the through-thickness waveguides can be coupled to surface-wave waveguides, which enables RF transmit and receive functionality into/from surrounding air (or water). The result is an aperture that can possess three desired components of a high temperature AESA: (1) low RF loss through the waveguides; (2) an ability to withstand high temperatures of exposure with regard to the waveguides and mechanical support structure; and (3) strong mechanical properties as provided by the mechanical support structure.

Exemplary embodiments can be configured in numerous arrangements readily apparent to those skilled in the art, including but not limited to, embodiments which include additional surface wave waveguides and/or reduce the number of through thickness waveguides. Such embodiments can reduce the amount of heat conducted through the aperture, permitting longer use at high temperatures.

As already mentioned, an exemplary high temperature radio frequency surface-aperture as disclosed herein includes: a mechanical support structure 106 configured for maintaining mechanical stiffness and strength at a selected temperature. The mechanical support structure can be at least one of, for example, a flat plate, singly-curved plate, doubly curved plate. The mechanical support structure 106 can be at least one of RF-lossy and/or RF-opaque. The mechanical support structure can be configured and selected for operation so as to be capable of withstanding high temperatures (e.g. >1000° C., >1400° C. or greater) while maintaining a specified degree of mechanical stiffness and strength at select temperatures so as to provide a specified and/or intended support function.

The mechanical support structure 106 can, for example, be formed of a metal (e.g. Inconel, Haynes, Ni superalloy, refractory metal (e.g., W, Mo, Ta, Nb) or a refractory metal alloy (e.g., TZM, C103, W-Re). The mechanical support structure can, for example, alternately be a ceramic matrix composite such as those including carbon (C) or silicon(S) (e.g., C-to-C, or C/C or C/SiC), or a metal matrix composite.

An exemplary mechanical support structure 106 can include a designated hot side and a designated cold side where the hot side is arranged for exposure to temperatures which exceed those of the cold side. For example, the material of the mechanical support structure can, for example, match (or is itself) the aeroshell or skin of a vehicle, such as an aerospace vehicle. Such features can reduce and/or minimize thermal stresses due to coefficient of thermal expansion mismatches.

As already mentioned, an exemplary radio frequency surface-aperture 100 of FIG. 1 as disclosed can include thermal insulation layer 108 having at least a single layer. The thermal insulation can be a single uniform layer or can be multiple layers, or any suitable combination thereof having a single or multiple materials to form the layers. For example, one or more layers of the thermal insulation can be porous graphite (e.g. CalCarb); porous alumina, aluminosilicate, silica, or other oxide insulation (e.g. Zircar SALI, min-K); or porous nitride (e.g BN).

The insulation of the exemplary embodiment has a hot side and a cold side, where the hot side is arranged for exposure to temperatures which will exceed those of the cold side. The cold side can, for example, be at e,g, 0° C., 25° C., 50° C., 100° C., 200° C., or any other environment which can be used to select the confirmation of the thermal insulation. The hot side of the insulation can be arranged in contact with the cold side of the mechanical support structure 106.

In accordance with exemplary embodiments, the thermal insulation layer(s) 108 is configured with materials and layers to withstand high temperatures of a specified environment or application of aperture use. The thickness of each layer of thermal insulation can be tailored such that each layer does not exceed is maximum use temperature, while minimizing overall insulation thickness and/or mass.

An exemplary radio frequency surface aperture 100 as already discussed can include one or more through-thickness waveguides located through a thickness of the mechanical support structure 106 and thermal insulation layer(s) 108. Each of the one or more through-thickness waveguides can penetrate the mechanical support structure and the thermal insulation, thus providing a low-loss RF path from the designated hot side of the mechanical support structure to a designated cold side of the thermal insulation. Each through-thickness waveguide can have a designated hot side, near the hot side of the mechanical support structure and a designated cold side, near the designated cold side of the thermal insulation In exemplary embodiments, the number of through thickness waveguides 104 of FIG. 1 can be minimized to minimize the heat conducted through the RF aperture. Each through-thickness waveguide can include the low-RF-loss core 214 shown in FIG. 2 (e.g., a dielectric). The core can be a low RF loss tangent dielectric with low thermal conductivity. The core can have uniform composition or graded composition. For example, the core, or a portion thereof, can be porous.

The core near the mechanical support structure 106 can be configured to be capable of withstanding high temperatures with low RF loss. The core can, for example, include boron nitride, hafnium oxide, hafnium silicate, zirconium oxide, aluminum oxide, celsian, and other suitable materials, the core can, for example, have a circular, rectangular, square, or elliptical cross-section. The sides of the core can, for example, be smooth (e.g., a roughness <10% of electrical skin depth).

The core of each FIG. 1 through-thickness waveguide 104 can be clad with the FIG. 2 electrically conductive layer 216, which layer can be relatively thin with respect to the core itself. The cladding can be highly electrically conductive (e.g., more conductive than the conductivity of the dielectric core), and a thickness of the cladding can be greater (e.g., although not much greater) than the skin depth of the RF radiation to minimize RF loss and also minimize thermal conduction. For example, the cladding thickness for RF applications can be on the order of more than 5 times a skin depth for conductive materials, or lesser or greater. The cladding can be, for example, W, Mo, Ta, Nb, Rh, Pt, or certain diborides (e.g. ZrB2), carbides, or nitrides that are electrically conductive at elevated temperature, or other suitable materials. There can be or multiple layers for to the cladding.

In the FIG. 2 cross section, the outer layer 218 of the cladding (i.e., closer to the mechanical support structure 106) can be configured to prevent diffusion and/or reaction of the mechanical support structure with other layers of the cladding or with the core. (e.g. a Ta/TaC layer can be chosen to prevent C in a C/C mechanical support structure from reacting with a W inner cladding layer, thus preventing the formation of WC). Such a diffusion/reaction prevention layer can be designed and configured to entirely prevent reaction or diffusion or to keep any reaction or diffusion far away from one skin depth from the dielectric-conductive layer interface.

The cladding can be configured with a changing composition in a direction from the waveguide hot side to the waveguide cold side. For example, the cladding can be a high temperature capable material (e.g., W) near the hot side, and transition to more electrically conductive but lower temperature capable material (e.g. Cu) near the cold side. Other surface patterns or layers can be added to enhance adhesion between the waveguide and the mechanical support layer. Those skilled in the art will appreciate that any of a variety of materials can be selected in accordance with the teachings of the present disclosure.

An exemplary radio-frequency surface-aperture 100 as disclosed includes a cold-side mode coupler 202 of FIG. 2, arranged to connect a designated cold side of the one or more through-thickness waveguides 104 to a subsystem 204, such as a radar or seeker device (e.g., to the output of a radar or seeker device). The cold side mode coupler can be a mode converter built onto a printed circuit board (PCB) with seeker electronics on the board. It can, for example, use standard microstrip-to-waveguide or stripline-to-waveguide techniques. Microstrip-to-waveguide transitions are known in the field. Examples of these structures are described in the documents Igarashi, Sadao, "Waveguide-microstrip line converter" U.S. Pat. No. 4,725,793, 16 Feb. 1988; Murphy, Earl R. "Microstrip to waveguide transition." U.S. Pat. No. 4,453,142, 5 Jun. 1984; and Sedivec, Darrel F. "Transition from stripline to waveguide" U.S. Pat. No. 4,562,416, 31 Dec. 1985, all of these documents being incorporated herein by reference in their entireties.

Thus, an exemplary radio-frequency surface-aperture as disclosed includes one or more surface-wave waveguides 102 on a surface of the mechanical support structure in operative communication with the through-thickness waveguides 104. The surface-wave waveguides 102 can also act an antenna, and each surface wave waveguide can be connected to one or more through-thickness waveguides. Each surface wave waveguide can be connected either directly or indirectly to the mechanical support structure.

Alternately, or in addition, each surface wave waveguide 102 can be intimately bonded to and/or fabricated on a mechanical support pane of the mechanical support structure. One or more surface wave waveguides can also be connected to each other in alternate embodiments as those skilled in the art will appreciate.

As illustrated in FIG. 2, each surface wave waveguide 102 can include a dielectric layer 208 on an external face of the RF surface aperture (e.g., furthest from the mechanical support structure). The dielectric layer can be a low RF loss tangent dielectric capable of withstanding high temperatures with low RF loss and withstanding highly oxidizing environments with minimal erosion or chemical reaction. The dielectric layer can, for example, include boron nitride, hafnium oxide, hafnium silicate, zirconium oxide, aluminum oxide, celsian, and/or other suitable materials.

The top of an exemplary dielectric layer 208 can be smooth and non-wavy. The bottom of the dielectric layer can have periodic undulations or notches. Thus, the dielectric thickness can be modified with a fixed periodicity P in order to excite radiation similar to a grating or hologram. A cladding such as a highly conductive layer/cladding relative to conductivity of the dielectric, can be configured to follow this periodicity. The mechanical support plane 106 can also follow this periodicity, at least on its hot side.

An RF mode can be confined to a center region of each waveguide where the dielectric is thicker. On the sides the dielectric is thinner, and this configuration can confine a wave between them.

Each surface wave waveguide 102 can include the layer 210 which serves as a conductive layer (e.g., more highly conductive relative to dielectric) that serves as an electrical ground. The conductive layer 210 can clad the bottom of the dielectric layer. The thickness of the cladding can be greater (e.g., not much greater) than the skin depth of the RF radiation to minimize RF loss and also minimize thermal conduction. For example, the cladding thickness for RF applications can be, as already noted, on the order of five times the skin depth of RF radiation, or lesser or greater, the skin depth being for example, on the order of a few microns or lesser or greater. The cladding can be e.g., W, Mo, Ta, Nb, Rh, Pt, or certain diborides (e.g. $ZrB_2$), carbides, or Nitrides that are electrically conductive at elevated temperatures, or other suitable materials. There can be one or multiple layers to form the cladding.

An inner layer of the cladding (i.e., closer to the mechanical support plane 106 structure) can be configured to prevent diffusion and/or reaction of the mechanical support structure with other layers of the cladding or with the core. For example, a Ta/TaC layer can prevent C in a C/C mechanical support structure from reacting with a W inner cladding layer, thus preventing formation of WC. Such a diffusion/reaction prevention layer can be configured to entirely prevent reaction or diffusion or to keep any reaction or diffusion far away from one skin depth from the dielectric-conductive layer interface. Other surface patterns or layers can be added to enhance adhesion between the waveguide and the mechanical support layer.

Figure 3:
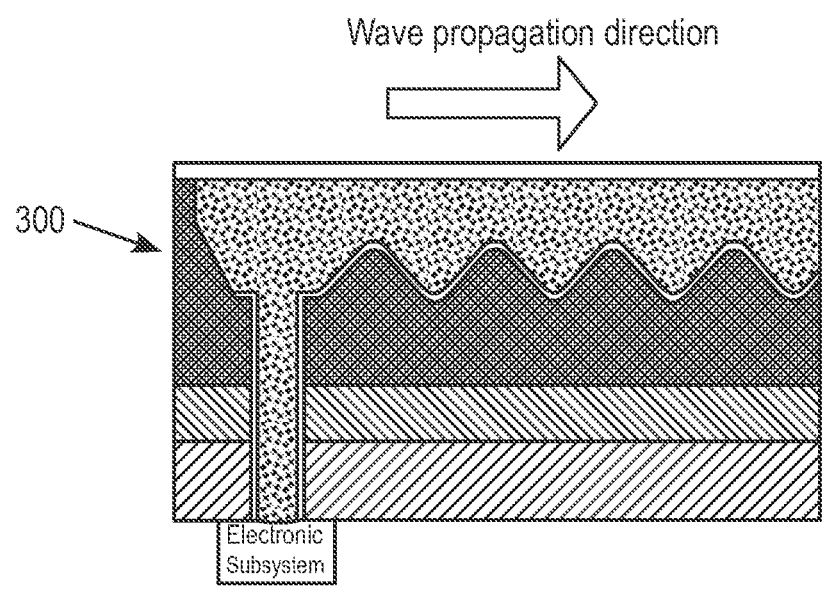
FIG. 3 illustrates an exemplary wave propagation direction and a mirror reflector.

In alternate embodiments, a mirror/reflector image mode-launcher 300 as shown in FIG. 3 can be included on the side of surface wave waveguide furthest from the through thickness waveguide connection to terminate the waveguide. Such a feature can be included so that RF energy doesn't scatter off the far wall or bounce off the far wall and head the other direction in the waveguide as depicted in FIG. 3. Each surface wave waveguide can have a high emissivity for radiative cooling in the visible and infrared regions of the EM spectrum. A surface coating can be added to improve emissivity in the visible spectrum and/or infrared spectrum.

An exemplary high temperature radio frequency surface-aperture can also optionally include a material or system to remove or store heat that conducts through to the cold side. For example, a thermal phase change material (e.g. a wax, an inorganic salt hydrate) can be included, and/or a composite of a thermal phase change material and a highly thermally conductive phase (e.g. graphite) can be included.

A vapor-compression refrigeration system can be provided, as can an air-cooled system (e.g. cooling fan), and/or a liquid cooled system.

A surface wave launcher 220 as shown in FIG. 2 can be configured with an aperture as disclosed herein. For example, a waveguide opening can be located approximately $\lambda/4$ from a reflective wall of the radio frequency surface-aperture to, for example preferentially launch a surface wave away from the wall bound to the grounded dielectric. $\lambda/4$ spacing can be used to minimize reflection from the wall back into the waveguide (i.e., without allowing propagation into the surface wave waveguides).

In exemplary embodiments, the waveguide opening can be the same size and shape as the circular waveguide or it can be a different size and/or shape. Alternate shapes include a slot, rectangular aperture, a polygonal aperture, a circular aperture, or an irregular polygon aperture. The aperture geometry can be tuned to allow maximal transmission from the waveguide to the surface wave waveguide at frequencies of interest for the seeker.

Another exemplary embodiment can include two or more waveguides that are phase tuned to preferentially launch a surface wave into a surface wave waveguide with minimal reflection. This phase tuning can be applied by the seeker electronics (i.e. utilizing phase shifters), or it can be based on the geometry of the waveguides. An exemplary embodiment utilizes the same structure for all waveguides as described herein relating to through-thickness waveguides. However, waveguides can also be made of different materials if desired, as those skilled in the art will appreciate.

Additional inductive or capacitive inclusions near the aperture can also be added to improve coupling between a waveguide mode and a surface wave waveguide mode. These inclusions can, for example, include metal-insulator-metal capacitive layers, or coiled metal inductance components. Exemplary inclusions can be high temperature dielectrics or metals as already described, but do not need to match the materials of the conductive ground or surface wave waveguide.

A method of manufacturing a radio frequency surface-aperture, as disclosed herein can include: providing a mechanical support structure selected for maintaining mechanical stiffness and strength at a selected temperature equal to or greater than 1200° C.; applying a thermal insulation having at least a single layer to the mechanical support structure; establishing one or more through-thickness waveguides through a thickness of the mechanical support structure and the thermal insulation; arranging a cold-side mode coupler in operative contact with the mechanical support structure and thermal insulation to connect a designated cold side of the one or more through-thickness waveguides to a radar or seeker device; and providing one or more surface-wave waveguides on a surface of the mechanical support structure in operative communication with the through-thickness waveguides.

The subsystem 204 (e.g., radar, or radar/seeker) can be configured in any known manner to receive electromagnetic energy (e.g., RF energy) and perform any desired seeking and/or radar function or other function. The subsystem can for example, include a computer processor and execute a software program stored on a non-transitory computer readable medium configured as a computer readable medium storing program code for performing data processing. A person having ordinary skill in the art will appreciate that embodiments of the disclosed subject matter can be practiced with one or more modules in a hardware processor device with an associated memory. A hardware processor device as discussed herein can be a single hardware processor, a plurality of hardware processors, or combinations thereof.

In an exemplary embodiment, control signals, processing algorithms, artificial intelligence capability and so forth can be provided to or from the electronic subsystem using any suitable local or remote database configuration. Suitable configurations and storage types will be apparent to persons having skill in the relevant art.

The exemplary computing device of the electronic subsystem can include a communications interface. The communications interface can be configured to allow software, control signals and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A radio frequency surface-aperture, comprising:
   a mechanical support structure configured for maintaining mechanical stiffness and strength at a selected temperature;
   thermal insulation having at least a single layer;
   one or more through-thickness waveguides located through a thickness of the mechanical support structure and thermal insulation;
   a cold-side mode coupler arranged to connect a designated cold side of the one or more through-thickness waveguides to an electronic subsystem; and
   one or more surface-wave waveguides arranged as a radio frequency (RF) antenna on a surface of the mechanical support structure in operative communication with the through-thickness waveguides.

2. A radio frequency surface-aperture according to claim 1, wherein the mechanical support structure is a plate which is at least one of RF-lossy, and/or is RF-opaque.

3. A radio frequency surface-aperture according to claim 1, wherein the mechanical support structure is configured for operation at temperatures up to and above 1200° C.

4. A radio frequency surface-aperture according to claim 1, wherein the mechanical support structure is configured to maintain its mechanical stiffness and strength at temperatures up to and above 1000° C.

5. A radio frequency surface-aperture according to claim 1, in combination with a vehicle aeroshell or skin, wherein a material of the mechanical support structure has a coefficient of thermal expansion which matches to, or which is that of, the vehicle aeroshell or skin.

6. A radio frequency surface-aperture according to claim 5, wherein the mechanical support structure has a designated hot side and a designated cold side, wherein the hot side is configured for exposure to temperatures which will exceed those of the cold side.

7. A radio frequency surface-aperture according to claim 1, wherein the thermal insulation is multiple layers, with a hot side of at least one layer of the multiple layers of the thermal insulation being in contact with the mechanical support structure.

8. A radio frequency surface-aperture according to claim 7, wherein the thermal insulation has a designated hot side and a designated cold side, wherein the hot side is configured for exposure to temperatures which will exceed those of the cold side.

9. A radio frequency surface-aperture according to claim 1, wherein each through-thickness waveguide of the one or more through-thickness waveguides has a core configured to reduce RF loss.

10. A radio frequency surface-aperture according to claim 9, wherein the core is a low RF loss tangent dielectric with low thermal conductivity.

11. A radio frequency surface-aperture according to claim 9, wherein at least a portion of the core is porous.

12. A radio frequency surface-aperture according to claim 9, wherein the core is clad with a thin, electrically conductive layer, with a thickness of the electrically conductive layer being selected to be greater than a skin depth of a selected RF radiation to minimize RF loss and thermal conduction, the electrically conductive layer having one or more layers.

13. A radio frequency surface-aperture according to claim 12, wherein each of the one or more through-thickness waveguides has a diffusion barrier as an outer layer of a cladding comprising the electrically conductive layer, the diffusion barrier configured to prevent diffusion and/or reaction of the mechanical support structure with other layers of the cladding or with the core, the cladding diffusion barrier comprising a Ta/TaC layer to prevent diffusion of carbon (C) from a C/C mechanical support structure and for preventing formation of tungsten carbide (WC).

14. A radio frequency surface-aperture according to claim 13, wherein the cladding has a composition that changes from a waveguide hot side to a waveguide cold side.

15. A radio frequency surface-aperture according to claim 1, wherein the one or more through-thickness waveguides are each configured to provide an RF path from a designated hot side of the mechanical support structure to a designated cold side of the thermal insulation.

16. A radio frequency surface-aperture according to claim 1, wherein the cold-side mode coupler is a mode converter located on a printed circuit board (PCB), in combination with electronics located on the PCB board.

17. A radio frequency surface-aperture according to claim 1, wherein each surface-wave waveguide of the one or more surface-wave waveguides includes a dielectric layer on an external face of the radio frequency surface-aperture, wherein a top of the dielectric layer is smooth, and a bottom of the dielectric layer has periodic undulations or notches.

18. A radio frequency surface-aperture according to claim 17,
   wherein each surface-wave waveguide of the one or more surface-wave waveguides comprises a conductive layer as an electrical ground and a diffusion barrier,
   wherein the conductive layer clads a bottom of the dielectric layer and comprises multiple layers; and wherein the diffusion barrier is closer to the mechanical support structure than the conductive layer is to the mechanical support structure and is configured to prevent diffusion and/or reaction of the mechanical support structure with the conductive layer.

19. A radio frequency surface-aperture according to claim 1, in combination with a radar or seeker connected to the cold-side mode coupler.

20. A radio frequency surface-aperture according to claim 1, comprising: a mirror image mode-launcher on a side of the one or more surface-wave waveguides furthest from the through-thickness waveguides to terminate the one or more surface-wave waveguides.

21. A radio frequency surface-aperture according to claim 1, comprising:
a system to remove or store heat that conducts through to the cold-side mode coupler when in operation.

22. A radio frequency surface-aperture according to claim 1, wherein at least one of the one or more through-thickness waveguides comprises a waveguide opening located approximately $\lambda/4$ from an external wall of the radio frequency surface-aperture.

23. A radio frequency surface-aperture as claimed in claim 22,
wherein the waveguide opening has a same size and shape as a cross-section of at least one of the one or more through-thickness waveguides; and
wherein the one or more through-thickness waveguides comprises two or more through-thickness waveguides that are phased tuned to launch a surface wave into at least one of the one or more surface-wave waveguides with reduced reflection.

24. A radio frequency surface-aperture as claimed in claim 22, further comprising:
inductive or capacitive inclusions near the waveguide opening for coupling between a waveguide mode and a surface-wave waveguide mode.

25. A method of manufacturing a radio frequency surface-aperture, the method comprising:
providing a mechanical support structure selected for maintaining mechanical stiffness and strength at a selected temperature up to or greater than 1200° C.;
applying a thermal insulation having at least a single layer to the mechanical support structure;
establishing one or more through-thickness waveguides through a thickness of the mechanical support structure and the thermal insulation;
arranging a cold-side mode coupler in operative contact with the mechanical support structure and thermal insulation to connect a designated cold side of the one or more through-thickness waveguides to an electronic subsystem; and
providing one or more surface-wave waveguides arranged as radio frequency (RF) antenna on a surface of the mechanical support structure in operative communication with the one or more through-thickness waveguides.

* * * * *